US012759412B2

(12) United States Patent
Draeger et al.

(10) Patent No.: US 12,759,412 B2
(45) Date of Patent: Oct. 13, 2026

(54) AXLE MODULE OF AN ELECTRICALLY DRIVEN VEHICLE

(71) Applicant: Robert Bosch GmbH, Stuttgart (DE)

(72) Inventors: Florian Draeger, Kirchheim am Neckar (DE); Michele Hirsch, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 276 days.

(21) Appl. No.: 18/580,876

(22) PCT Filed: Jun. 27, 2022

(86) PCT No.: PCT/EP2022/067588

§ 371 (c)(1),
(2) Date: Jan. 19, 2024

(87) PCT Pub. No.: WO2023/011802

PCT Pub. Date: Feb. 9, 2023

(65) Prior Publication Data

US 2025/0091447 A1 Mar. 20, 2025

(30) Foreign Application Priority Data

Aug. 3, 2021 (DE) ..................... 10 2021 208 404.4

(51) Int. Cl.
*B60L 15/20* (2006.01)
*B60Q 5/00* (2006.01)

(52) U.S. Cl.
CPC .............. *B60L 15/20* (2013.01); *B60Q 5/008* (2013.01); *B60L 2250/10* (2013.01); *B60L 2270/142* (2013.01)

(58) Field of Classification Search
CPC ................. B60L 15/20; B60L 2250/10; B60L 2270/142; B60Q 5/006; B60Q 5/008
See application file for complete search history.

(56) References Cited

U.S. PATENT DOCUMENTS 8,651,215 B2 * 2/2014 Ogura ..................... B60L 50/66 180/65.6
11,511,629 B2 * 11/2022 Oide ................... B60L 15/2054
(Continued)

FOREIGN PATENT DOCUMENTS

CN 1847067 A 10/2006
DE 202008004406 U1 8/2009
(Continued)

OTHER PUBLICATIONS

Translation of International Search Report for Application No. PCT/EP2022/067588 dated Oct. 31, 2022 (3 pages).

*Primary Examiner* — Tyler J Lee
(74) *Attorney, Agent, or Firm* — Michael Best & Friedrich LLP

(57) ABSTRACT

The invention relates to an axle module (1) of a vehicle (10), comprising: —a drive unit (2), which has a vehicle axle (21), an electric motor (22), a transmission (23) and power electronics (24), wherein the vehicle axle (21) is designed for connecting to vehicle wheels (11); —a module carrier (3), which is designed for connecting to a vehicle body (12) of the vehicle (10); —an assembly bearing (4), which connects the drive unit (2) and the module carrier (3) to each other; and —a control device (5); wherein the drive unit (2), the module carrier (3) and the assembly bearing (4) jointly form a vibration transmission path (50), and wherein the control device (5) is designed to actuate the drive unit (2) in a controlled manner in accordance with acoustic and/or mechanical vibration transmission via the vibration transmission path (50), such that noise emission of the axle module (1) during operation of the axle module (1) is adjusted in a predefined way.

12 Claims, 1 Drawing Sheet

(56) References Cited

U.S. PATENT DOCUMENTS

| | | | | |
|---|---|---|---|---|
| 2008/0128190 | A1* | 6/2008 | Tsutsumi | B62J 1/28 180/219 |
| 2012/0067659 | A1* | 3/2012 | Ogura | B62K 11/10 180/65.6 |
| 2012/0137809 | A1* | 6/2012 | Kim | B60Q 9/00 74/431 |
| 2021/0031635 | A1* | 2/2021 | Oide | B60L 15/2072 |

FOREIGN PATENT DOCUMENTS

| | | | |
|---|---|---|---|
| DE | 102008033414 | A1 | 1/2010 |
| DE | 202011002194 | U1 | 4/2011 |
| DE | 102010043973 | A1 | 5/2012 |
| DE | 102015224722 | A1 | 6/2017 |
| DE | 102019204956 | A1 | 10/2020 |
| DE | 102020126098 | A1 | 12/2021 |
| DE | 102021102266 | B3 | 3/2022 |

* cited by examiner

AXLE MODULE OF AN ELECTRICALLY DRIVEN VEHICLE

BACKGROUND

The present invention relates to an axle module of a vehicle, a vehicle, a method of manufacturing an axle module, and a method of operating an axle module.

The design of vehicle components, such as drive units and drive unit carriers, with regard to the lowest possible noise emissions is well known. In particular, a noise emission into an interior of the vehicle is especially relevant for driving comfort of a driver of the vehicle. To avoid noise emissions caused by vibration excitation, for example, the components must be optimally matched to one another. The actual noise occurring in the vehicle can usually only be assessed when the vehicle is in an assembled state. However, the development of the components is usually already well advanced, so that subsequent modifications to reduce noise are usually difficult to implement and cost-intensive.

SUMMARY

In contrast, the axle module according to the disclosure is characterized by a noise-optimized design which can be implemented simply and inexpensively. This is achieved by an axle module comprising a drive unit, a module carrier, an assembly bearing, and a control device. The drive unit has a vehicle axle, which is designed for connection to vehicle wheels, an electric motor, a transmission, and power electronics. The module carrier is designed for connection to a vehicle body of the vehicle. The assembly bearing connects the drive unit and the module carrier to each other. The drive unit, the module carrier, and the assembly bearing form a common vibration transmission path. The control device is designed to actuate the drive unit in a controlled manner as a function of an acoustic and/or mechanical vibration transmission, which takes place via the vibration transmission path, in such a way that a noise emission of the axle module is adjusted in a predefined way during operation of the axle module.

In other words, an axle module is provided which forms a common acoustically optimally designed unit in order to be able to achieve certain desired noise emissions. In this case, actuation of the drive unit of the axle module is controlled as a function of the vibration transmission path.

The axle module offers the advantage that the part significantly responsible for noise emissions, namely in particular the drive unit, and a large part of the transmission path of the noise in a vehicle can be designed acoustically as an integral unit. This means that the axle module can be used, for example, for a wide variety of vehicles, wherein an optimum design with regard to desired noise emissions, such as the lowest possible noise emissions, can also be implemented in a simple manner in different vehicle designs. The known matching of the components of the axle module to each other also enables cost-effective and simple adjusting of the axle module to a wide variety of vehicles.

In particular, the axle module can be used to map and optimize the largest possible transmission path of acoustic and/or mechanical vibrations up to an interior of the vehicle. This means, for example, that the acoustic design of the axle module can be optimized for particularly high driving comfort for the driver of the vehicle.

Preferably, the control device is designed to actuate the drive unit in a controlled manner in such a way as to reduce, preferably minimize, noise emission from the axle module. In particular, the reduction of noise emission is thereby provided in comparison to a normal operation of the drive unit, in which no actuation specifically adapted to the acoustic and/or mechanical vibration transmission via the vibration transmission path takes place.

Particularly preferably, the control device is designed to actuate the drive unit in a controlled manner such that the axle module generates a predefined warning noise, preferably an acoustic vehicle alerting signal (AVAS signal for short). Preferably, the control device is thereby designed to initiate the generation of the predefined warning noise as a function of objects, preferably road users, detected in an environment of the axle module, in particular of a vehicle. This means that the axle module can also be used to generate certain warning noise in a particularly simple and cost-effective manner. For example, this can eliminate the need for separate signaling devices, such as loudspeaker systems or the like.

Further preferably, the control device is designed to adjust an operating signal, by means of which the motor is actuated, as a function of the acoustic and/or mechanical vibration transmission via the vibration transmission path. In particular, the operating signal is provided to the motor by means of the power electronics. Preferably, the operating signal is an electric current, in particular an alternating current.

Particularly preferably, the operating signal by means of which the motor is actuated usually has a sinusoidal basic vibration. The control device is designed to adjust the noise emission of the axle module by modulating harmonics onto the sinusoidal basic vibration of the operating signal. That is, the operating signal is modified by the additional harmonics in such a way that the harmonics lead to a corresponding actuation of the drive unit, so that the noise emissions can be adjusted in a predefined way. This allows particularly flexible adjusting of the axle module, for example to different vehicles or also to different driving operations of a vehicle.

Further preferably, the module carrier comprises at least one connecting element configured for connection to the vehicle body of the vehicle. The connecting element is part of the vibration transmission path. For example, the connecting element may be configured in the form of one or more struts. Preferably, the connecting element may be configured to be screwed and/or welded and/or bonded to the vehicle body. This means that a particularly large part of the transmission path for noise into the vehicle interior can be covered by the acoustic design of the axle module.

Preferably, the assembly bearing has several bearing elements. For example, the bearing elements can be configured as rubber bearings, which, for example, allow the drive unit and module carrier to be connected with a certain degree of vibration damping.

Further, the invention leads to a vehicle comprising a vehicle body and the described axle module. The vehicle body and the axle module are joined together, for example welded and/or screwed and/or bonded.

Preferably, the control device of the axle module is designed to actuate the drive unit in a controlled manner in order to reduce, in particular minimize, noise emission into an interior of the vehicle. This can provide a particularly high level of driving comfort for a driver of the vehicle.

Particularly preferably, the axle module is arranged on a front axle or alternatively on a rear axle of the vehicle. Alternatively, the vehicle comprises two axle modules, with one of the two axle modules being arranged on the front axle and one on the rear axle of the vehicle.

Furthermore, the invention relates to a method for manufacturing an axle module of a vehicle, in particular the described axle module. The method comprises the steps of:

providing a drive unit comprising a vehicle axle, a motor, a whirled-in motor, and power electronics, wherein the vehicle axle is designed for connection to vehicle wheels, providing a module carrier which is designed to be connected to a vehicle body of the vehicle, providing an assembly bearing, connecting the drive unit and the module carrier to each other by means of the assembly bearing so that the drive unit and the module carrier and the assembly bearing form a common vibration transmission path, and providing a control device which is designed to actuate the drive unit. The control device is designed to actuate the drive unit in a controlled manner as a function of an acoustic and/or mechanical vibration transmission via the vibration transmission path in such a way that a noise emission of the axle module is adjusted in a predefined way during operation of the axle module. The method thus permits an essentially unique design of the axle module with regard to optimum noise emission, making it possible to manufacture the axle module in a particularly simple and cost-effective manner.

Preferably, the method of manufacturing the axle module further comprises the step of: calibrating the vibration transmission path in the assembled state of the axle module. This means that calibration takes place when the drive unit, module carrier, and assembly bearing are connected. In particular, calibration is performed by adjusting a corresponding function of the control device, which is designed to actuate the drive unit.

Calibration is particularly preferred before the axle module is installed in a vehicle. This means that the axle module is already optimally acoustically designed as a unit before it is subsequently installed in a vehicle. As a result, the axle module can be provided for a wide range of vehicles, with the vehicles always having advantageous acoustic transmission paths, especially for high driver comfort due to low noise emissions into an interior of the vehicle.

Further, the invention leads to a method of operating the axle module described above, which is preferably produced by the described method of producing an axle module. The method of operating the axle module comprises the step of: actuating the drive unit by means of the control device as a function of an acoustic and/or mechanical vibration transmission via the vibration transmission path in such a way as to adjust in a predefined way a noise emission of the axle module during an operation of the axle module. In particular, the actuation of the drive unit takes place in such a way that the motor is actuated by the control device via the power electronics.

Preferably, in the method for operating the axle module, the drive unit is actuated by means of the control device in such a way as to reduce the noise emission of the axle module. This can, for example, enable a particularly high level of driving comfort for a driver of the vehicle in which the axle module is installed.

Particularly preferably, in the method for operating the axle module, the drive unit is actuated by means of the control device in such a way that the axle module generates a predefined warning noise, preferably an AVAS signal, during its operation.

BRIEF DESCRIPTION OF THE DRAWINGS

The invention is described in the following with reference to an exemplary embodiment in conjunction with the figures. In the figures, functionally equivalent components are identified with the same respective reference numerals. The figures show.

PREFERRED EMBODIMENTS OF THE INVENTION

Figure 1:
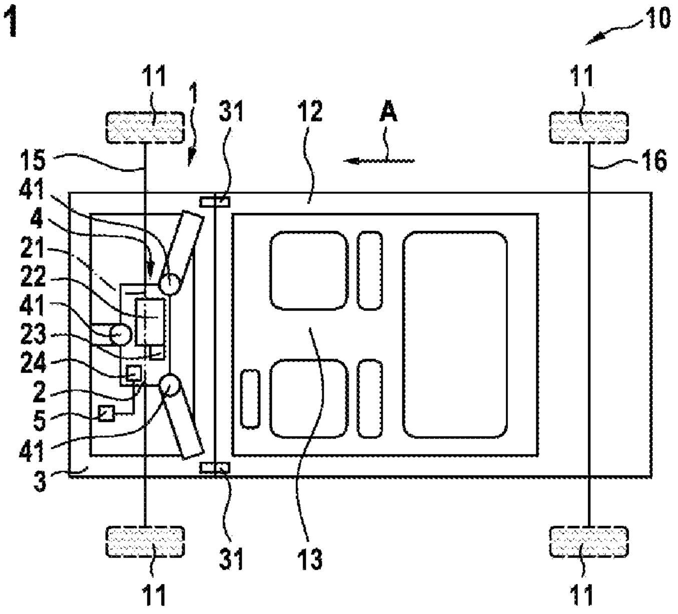
FIG. 1 a simplified schematic view of a vehicle according to a preferred exemplary embodiment of the invention, and FIG. 2 a simplified schematic view of a vibration transmission in the vehicle of FIG. 1.

FIG. 1 shows a simplified schematic view of a vehicle 10 according to a preferred exemplary embodiment of the invention. The vehicle 10 comprises an axle module 1, which is arranged on a front axle 15 of the vehicle 10, which is located at the front in the direction of travel A. Alternatively, the axle module 1 or an additional second axle module 1 could also be arranged on a rear axle 16 of the vehicle 10.

The axle module 1 is characterized by a noise-optimized design and mode of operation, which is described below.

The axle module 1 comprises a drive unit 2. The drive unit 2 is configured as an integrated unit comprising an electric motor 22, which is used to drive the vehicle 10 and is supplied with electrical energy by means of an electrical energy storage device (not shown). In addition to the motor 22, a transmission 23, which is connected to the motor 22, power electronics 24, and a vehicle axle 21 are integrated into the drive unit 2. Preferably, the drive unit 2 has a common housing in which the motor 22, transmission 23, and power electronics 24 are integrated.

In this regard, the power electronics 24 are provided between the electrical energy storage device and the electric motor 22 to adjust the electrical energy supply to the motor 22. The vehicle axle 21 is also designed for connection to vehicle wheels 11 of the vehicle 10.

By means of the power electronics 24, an electric current is thereby provided to the motor 22 as an operating signal, the electric current being an alternating current which actuates the motor 22 in the form of a sinusoidal basic vibration.

Furthermore, the axle module 1 comprises a control device 5, which is designed to actuate the drive unit 2 in a controlled manner via the power electronics 24.

Furthermore, the axle module 1 comprises a module carrier 3, which is designed for connection to a vehicle body 12 of the vehicle 10. The module carrier 3 is preferably configured as a frame or framework and provided as a mounting and interface between the drive unit 2 and the vehicle body 12. For example, the module carrier 3 can have connecting elements 31 which are designed to be screwed on to the vehicle body 12.

The axle module 1 also comprises an assembly bearing 4, which connects the drive unit 2 and the module carrier 3. The assembly bearing 4 has several bearing elements 41, which mechanically connect the drive unit 2 and the module carrier 3 at several points. For example, the bearing elements 41 can be at least partially elastic.

The drive unit 2, the module carrier 3, and the assembly bearing 4 thereby form a common vibration transmission path 50, via which in particular mechanical and acoustic vibrations are transmitted from the drive unit 2 to the vehicle body 12 and thus also into an interior 13 of the vehicle 10.

Figure 2:
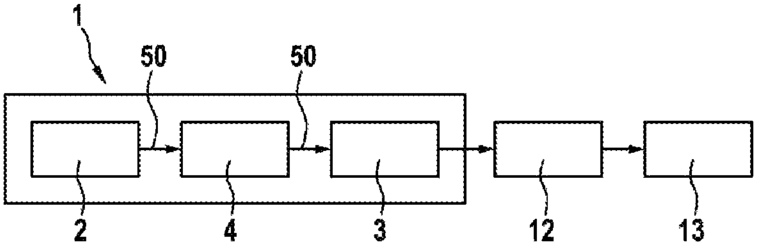

For illustration purposes, the vibration transmission in the vehicle 10 is shown in simplified schematic form in FIG. 2. The vibrations are generated in the drive unit 2. The vibrations are then further transmitted according to the direction indicated by the arrows. In detail, the vibrations are further transmitted via the assembly bearing 4 to the module carrier 3 and from the module carrier 3 further to the vehicle body 12. From the vehicle body 12, the vibrations can be radiated as noise into the vehicle interior 13, which can be perceived as unpleasant by a driver of the vehicle 10, for example.

The vibration transmission path 50, that is, the mechanical design of the components and their connection of the axle module 1 are thereby designed as a unit to achieve reduced noise emission into the interior 13 during an operation of the drive unit 2.

In addition to the advantageous structural design of the axle module 1, the low-noise operation of the axle module 1 can be further optimized by the operation mode of the control device 5. In detail, the control device 5 is designed to operate the drive unit 2 in a noise reduction mode in which the drive unit 2 is actuated in a controlled manner depending on the acoustic and mechanical vibration transmission via the vibration transmission path 50 in such a way as to reduce the noise emission of the axle module 1 during operation of the axle module 1.

Harmonics are modulated onto the sinusoidal basic vibration of the operating signal, in particular as a function of the instantaneous noise emission of the drive unit 2, and as a function of the vibration transmission path 50.

In other words, the control device 5 has a software function that can modulate the harmonics onto the sinusoidal basic vibration by control. In particular, the harmonics can be used to selectively actuate the drive unit 2, which counteracts the noise emissions of the drive unit 2 and thus achieves a noise reduction. Preferably, this principle is based on destructive interference of the vibrations generated by the drive unit 2 by its operation with counter-vibrations specifically generated by modulation of the operating signal.

Additionally, the control device 5 can operate the drive unit 2 in a noise amplification mode. The mode of actuation and operation is analogous to the noise reduction mode, wherein the drive unit 2 is actuated in a controlled manner so as to generate a predefined warning noise as the resulting noise emission. Preferably, an AVAS signal can be generated as a warning noise, which can be used, for example, in response to a presence of other road users, to warn the other road users or to indicate a presence of the vehicle 10.

The advantage of the noise-optimized design and operation of the axle module 1 is clearly shown in FIG. 2. Since the axle module 1 forms a large part of the overall path for vibration transmissions in the vehicle 10, a desired acoustic design can be made possible in a simple and cost-effective manner by appropriate design of only the axle module 1. In particular, since the axle module 1 can be provided as a subassembly for the vehicle 10, it is also possible to easily adapt it to any other vehicles, while also always enabling optimum noise operation.

The invention claimed is:

1. An axle module of a vehicle (10), comprising:

a drive unit (2), which has a vehicle axle (21), an electric motor (22), a transmission (23), and power electronics (24), wherein the vehicle axle (21) is configured to connect to vehicle wheels (11), a module carrier (3) which is configured to connect to a vehicle body (12) of the vehicle (10), an assembly bearing (4), which connects the drive unit (2) and the module carrier (3) to each other, and a control device (5), wherein the drive unit (2), the module carrier (3) and the assembly bearing (4) jointly form a vibration transmission path (50), and wherein the control device (5) is configured to actuate the drive unit (2) in a controlled manner to reduce a noise emission of the axle module (1) in accordance with acoustic and/or mechanical vibration transmission via the vibration transmission path (50), such that noise emission of the axle module (1) during operation of the axle module (1) is adjusted in a predefined way.

2. The axel module according to claim 1, wherein the control device (5) is configured to actuate the drive unit (2) in a controlled manner such that the axle module (1) generates a predefined warning noise.

3. The axel module according to claim 1, wherein the control device (5) is configured to adjust an operating signal, by means of which the motor (22) is actuated as a function of the acoustic and/or mechanical vibration transmission via the vibration transmission path (50).

4. The axle module according to claim 3, wherein the operating signal by means of which the motor (22) is actuated has a sinusoidal basic vibration, and wherein the control device (5) is configured to modulate harmonics onto the sinusoidal basic vibration of the operating signal to adjust the noise emissions of the axle module (1).

5. The axle module according to claim 1, wherein the module carrier (3) comprises at least one connecting element (31) configured to connect to the vehicle body (12) of the vehicle (10), and wherein the connecting element (31) is part of the vibration transmission path (50).

6. A vehicle, comprising:

a vehicle body (12), and an axle module (1) having a drive unit (2), which has a vehicle axle (21), an electric motor (22), a transmission (23), and power electronics (24), wherein the vehicle axle (21) is configured to connect to vehicle wheels (11), a module carrier (3) which is configured to connect to a vehicle body (12) of the vehicle (10), an assembly bearing (4), which connects the drive unit (2) and the module carrier (3) to each other, and a control device (5), wherein the drive unit (2), the module carrier (3) and the assembly bearing (4) jointly form a vibration transmission path (50), and wherein the control device (5) is configured to actuate the drive unit (2) in a controlled manner to reduce a noise emission of the axle module (1) in accordance with acoustic and/or mechanical vibration transmission via the vibration transmission path (50), such that noise emission of the axle module (1) during operation of the axle module (1) is adjusted in a predefined way, wherein the vehicle body (12) and the axle module (1) are connected to each other.

7. The vehicle according to claim 6, wherein the axle module (1) is arranged on a front axle (15) or on a rear axle (16) of the vehicle (10), or wherein the vehicle (10) comprises two axle modules (1), wherein one axle module (1) is arranged on the front axle (15) and one on the rear axle (16) of the vehicle (10).

8. A method for manufacturing an axle module (1) of a vehicle (10), comprising the steps:

providing a drive unit (2) comprising a vehicle axle (21), a motor (22), a transmission (23), and power electronics (24), wherein the vehicle axle (21) is configured to connect to vehicle wheels (11), providing a module carrier (3) which is configured to be connected to a vehicle body (12) of the vehicle (10), providing an assembly bearing (4), connecting the drive unit (2) and the module carrier (3) to each other by means of the assembly bearing (4), so that the drive unit (2) and the module carrier (3) and the assembly bearing (4) form a common vibration transmission path (50), and providing a control device (5) which is configured to actuate the drive unit (2) in a controlled manner to reduce a noise emission of the axle module (1) as a function of an acoustic and/or mechanical vibration transmission via the vibration transmission path (50) in such a way that a noise emission of the axle module (1) is adjusted in a predefined way during operation of the axle module (1).

9. The method according to claim 8, further comprising the step of:

calibrating the vibration transmission path (50) in the assembled state of the axle module (1).

10. The method according to claim 9, wherein the calibrating is performed prior to an installation of the axle module (1) into a vehicle (10).

11. The method of operating an axle module (1) according to claim 8, comprising the step of:

actuating the drive unit (2) by means of the control device (5) as a function of an acoustic and/or mechanical vibration transmission via the vibration transmission path (50) in such a way as to adjust in a predefined way a noise emission of the axle module (1) during an operation of the axle module (1).

12. The method according to claim 11, wherein the drive unit (2) is actuated by means of the control device (5) in such a way that the axle module (1) generates a predefined warning noise.

* * * * *